United States Patent [19]
Winfield et al.

[11] 3,864,456
[45] Feb. 4, 1975

[54] MANUFACTURE OF CHLORINE DIOXIDE, CHLORINE AND ANHYDROUS SODIUM SULPHATE

[75] Inventors: John D. Winfield, Scarborough, Ontario; Herbert C. Scribner, Islington, Ontario; James D. Mc Gilvery, Port Credit, Ontario, all of Canada

[73] Assignee: Electric Reduction Company of Canada, Ltd., Toronto, Ontario, Canada

[22] Filed: June 3, 1970

[21] Appl. No.: 41,762

Related U.S. Application Data

[63] Continuation of Ser. No. 471,132, July 12, 1965, abandoned.

[30] Foreign Application Priority Data
Aug. 13, 1964 Great Britain.................... 33093/64

[52] U.S. Cl................. 423/478, 423/504, 423/506, 523/551, 423/552
[51] Int. Cl........................................... C01b 11/02
[58] Field of Search ............ 23/152, 121, 295, 302; 423/477–480, 551, 552, 504, 505, 506

[56] References Cited
UNITED STATES PATENTS

| | | | |
|---|---|---|---|
| 1,879,445 | 9/1932 | Othmer............................ | 23/295 X |
| 2,280,938 | 4/1942 | Vincent ........................... | 23/152 X |
| 2,317,443 | 4/1943 | Cunningham...................... | 423/478 |
| 2,374,004 | 4/1945 | Ebert................................. | 23/121 |
| 2,481,240 | 9/1949 | Rapson et al...................... | 23/152 |
| 2,620,260 | 12/1952 | Ekman............................. | 423/480 |
| 2,654,656 | 10/1953 | Evans............................... | 423/478 X |
| 2,664,341 | 12/1953 | Kesting ............................. | 423/478 |
| 2,737,451 | 3/1956 | Sacman............................ | 423/396 X |
| 2,811,420 | 10/1957 | Pernert .............................. | 23/152 |
| 2,863,722 | 12/1958 | Rapson ............................ | 23/152 |
| 3,341,288 | 9/1967 | Partridge et al. ................... | 23/152 |
| 3,347,628 | 10/1967 | Sepall et al. ...................... | 23/121 |
| R23,111 | 5/1949 | Holst................................ | 423/480 |

FOREIGN PATENTS OR APPLICATIONS

| | | | |
|---|---|---|---|
| 150,035 | 4/1966 | Argentina .......................... | 423/478 |
| 160,482 | 7/1964 | Brazil................................ | 423/478 |
| 543,589 | 7/1959 | Canada............................. | 423/478 |
| 543,590 | 7/1959 | Canada............................. | 423/478 |
| 543,591 | 7/1959 | Canada............................. | 423/480 |
| 825,084 | 10/1969 | Canada............................. | 423/478 |
| 128,003 | 4/1950 | Sweden............................ | 423/478 |
| 138,858 | 1/1953 | Sweden............................ | 423/480 |
| 869,048 | 3/1953 | Germany .......................... | 423/478 |
| 971,823 | 4/1959 | Germany .......................... | 423/480 |
| 1,054,076 | 4/1959 | Germany .......................... | 423/480 |

OTHER PUBLICATIONS

Rapson, "Recent Developments in the Manufacture of Chlorine Dioxide," Paper Trade Journal, Dec. 29, 1958, pps. 18–22.

*Primary Examiner*—Earl C. Thomas
*Attorney, Agent, or Firm*—Sim & McBurney

[57] ABSTRACT

A process for generation of chlorine dioxide and chlorine is disclosed in which anhydrous sodium sulphate is produced as a byproduct. Sodium chlorate, sodium chloride and sulphuric acid are charged in suitable proportions with the acidity maintained between about 1.0 and 2.4 molar. The temperature of the reaction solution is maintained between about 30°C and the temperature above which substantial decomposition of chlorine dioxide would occur. Chlorine dioxide and chlorine are withdrawn and the reaction liquor is evaporated to crystallize sodium sulphate which is recovered.

7 Claims, 1 Drawing Figure

PATENTED FEB 4 1975　　　　　　　　　　　3,864,456
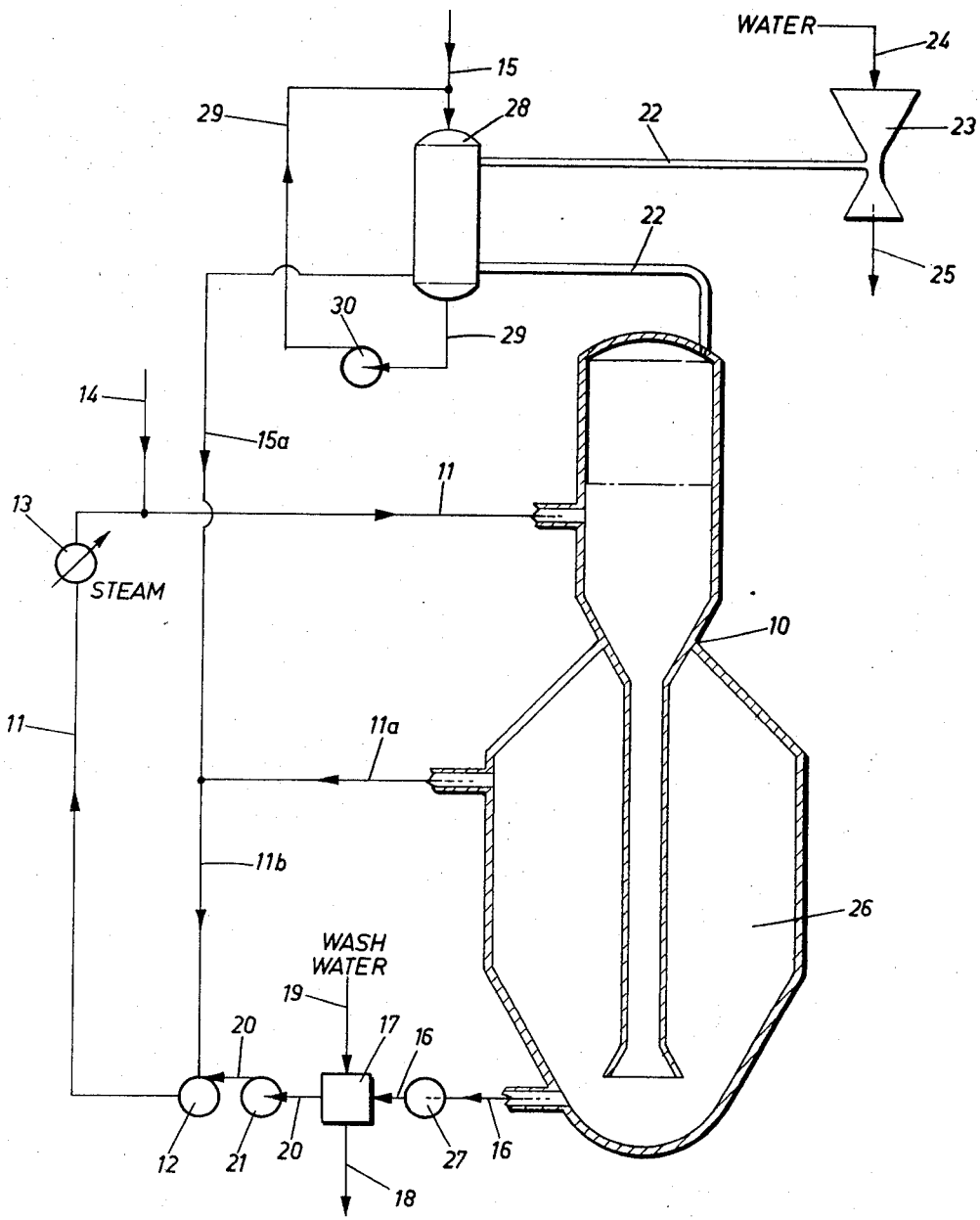

MANUFACTURE OF CHLORINE DIOXIDE, CHLORINE AND ANHYDROUS SODIUM SULPHATE

This application is a Continuation of application Ser. No. 471,132, filed July 12, 1965, and now abandoned.

This invention relates to the manufacture of chlorine dioxide and chlorine and the production of anhydrous sodium sulphate preferably, but not essentially, in a single vessel to which sodium chlorate, sodium chloride and sulphuric acid, are charged.

Chlorine dioxide has been manufactured in the past along with some chlorine by introducing an aqueous solution of sodium chlorate and sodium chloride and concentrated sulphuric acid into a reaction vessel in a continuous manner. The chlorine and chlorine dioxide so produced are removed from the reacting solution by an air stream or by evacuation, and the other products of reaction and the excess acid required to cause the reaction to proceed at a sufficiently high rate overflow from the reaction vessel to waste or to a suitable recovery process. The reaction involved is represented by the following equation:

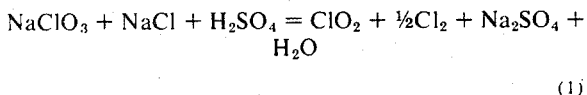

(1)

In addition to reaction (1) the following reaction will occur if the mole ratio of chloride to chlorate introduced exceeds the ratio of 1:1

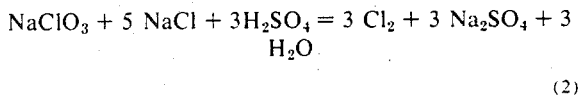

(2)

While this process operates very efficiently, 95 percent or more of the sodium chlorate added being converted into chlorine dioxide, the reacting solution must be maintained at high acidity, approximately ten normal in sulphuric acid, in order to cause nearly all the chlorate and chloride to react, so as to minimize the loss of these reactants in the effluent solution. This means that approximately 3.2 lbs. of sulphuric acid are lost in the effluent solution along with approximately 2.1 lbs. of sodium sulphate per pound of chlorine dioxide produced.

In situations in which the effluent acid and sodium sulphate can be recovered and used usefully, this process is very economical and is widely used. For example, in kraft pulp mills where chlorine dioxide is generated by this process for bleaching the pulp, often the effluent acid is used for acidification of tall oil soap to produce tall oil. After separating of the tall oil, the aqueous solution is introduced into the kraft mill chemical recovery system, thereby obtaining value for the sodium sulphate contained in the effluent solution.

In other situations where the acid value cannot be recovered in such a manner, the effluent solution may be introduced into the kraft mill chemical recovery system directly, in order to recover the value of the sodium sulphate. In some cases the acid also is valuable in helping to maintain the sulphidity of the cooking liquor. In other cases the acid is considered unnecessary and has no value.

Another way to recover full value from the effluent from the chlorine dioxide generator is disclosed in copending Canadian patent application Ser. No. 897,142, filed Mar. 5, 1964 now Canadian Pat. No. 803,929. This process involves adding the aqueous solution of sodium chlorate and sodium chloride to the effluent from the chlorine dioxide generator, plus some additional water, and cooling the mixture to approximately −15°C, in order to crystallize out Glauber's salt, sodium sulphate decahydrate, in a separate crystallizing vessel in which the solution is cooled by a mechanical refrigeration unit and a heat exchanger. The crystals are separated, and the mother liquor now containing chloric acid and hydrochloric acid along with the excess sulphuric acid is returned to the generator to produce more chlorine dioxide. All the water added to the system must be evaporated out, and a stream of generator liquor is passed through a separate evaporator unit to remove the water and is returned to the generator.

In its preferred form the present invention involves a very much simpler process for generating chlorine dioxide and chlorine, crystallizing out anhydrous sodium sulphate and evaporating the water from the system all in a single vessel.

In order to crystallize anhydrous sodium sulphate ($Na_2SO_4$) and produce chlorine and chlorine dioxide, we have discovered that certain conditions, to be set out hereinafter in greater detail, must be observed. By operating this single combined generator, crystallizer and evaporator under suitable vacuum, and by adding heat to the liquor, e.g., by means of a heat exchanger incorporated in the system, the water is boiled off, and the water vapor so produced dilutes the chlorine dioxide and thus minimizes the risk of explosive decomposition of it.

While any type of equipment may be used to evacuate the generator-evaporator-crystallizer vessel, it is preferred to evacuate by means of a water jet eductor, in which the water serves to produce the necessary vacuum, to condense the water vapor and to dissolve the chlorine dioxide and chlorine produced to give a solution which may be used directly for bleaching pulp or other purposes such as water treatment.

A system employing a combination generator-evaporator-crystallizer operating under vacuum greatly simplifies the production of chlorine dioxide. The sodium chlorate and sodium chloride may be introduced into the system as an aqueous solution containing any desired ratio of the two reactants, or as separate solutions of the two. It also is possible to add these salts in dry form. In any case these reactants may be added continuously to the system, specifically to the combination generator-evaporator-crystallizer. A separate stream of sulphuric acid of any desired concentration, including concentrations above 100 percent, that is, solutions containing dissolved $SO_3$ in sulphuric acid, also may be added continuously to the combination generator-evaporator-crystallizer.

The molar ratio of chloride to chlorate in the feed solution to the combination generator-evaporator-crystallizer may be varied over a wide range. From a practical point of view it generally will be between about 1:1 and 6:1. Depending upon the acidity of the reaction solution in the combination generator-evaporator-crystallizer and the temperature of the reaction solution, the use of a feed solution wherein the molar ratio of chloride to chlorate is close to 1:1 or to 6:1 may lead to the precipitation of sodium chlorate or sodium chloride respectively, which will be recovered along with anhydrous sodium sulphate. This can be avoided by altering the composition of the feed solution so that the molar ratio of chloride to chlorate is closer to the centre of the range of 1:1 to 6:1. For the production of chlorine dioxide the use of a feed solution having a molar ratio of the order of from 1.1:1 to 1.3:1 is preferred.

If the temperature of the reaction solution is maintained above about +30°C. and acid molarity between about 1 molar and about 2.2 molar, we have discovered that anhydrous sodium sulphate will be crystallized when the requisite amount of water has been evaporated. At higher acidities, i.e., around 2.4 molar, some sodium sesquisulphate $Na_3H(SO_4)_2$ may be crystallized as well. The temperature of the reaction solution may be as high as about 100°C., in any event below the temperature at which the chlorine dioxide produced would decompose to a significant extent.

One way of carrying out the process is as follows:

A chloride to chlorate ratio in the feed solutions is chosen to give the desired ratio of $ClO_2/Cl_2$. The rates at which the chlorate, chloride and acid are fed to the vessel then are chosen to give the desired production rate of $ClO_2$, $Cl_2$ and anhydrous sodium sulphate. Acidity and temperature are related to each other and are chosen so as to obtain anhydrous sodium sulphate and the desired production rate of this salt $ClO_2$ and $Cl_2$. The acidity of the reaction solution must be between about 1 molar and 2.4 molar in $H_2SO_4$. The concentration of chloride and chlorate in the reaction solution are dependent variables, and, under steady state conditions, adjust themselves to the levels required by other vessel operating conditions.

A temperature then is chosen at which crystalline anhydrous sodium sulphate ($Na_2SO_4$) will be obtained. In order to adjust the contents of the generator-evaporator-crystallizer to the desired temperature, a corresponding vacuum is applied to the generator-evaporator-crystallizer, and the rate of heat input into the reaction solution is adjusted to raise the temperature of the reaction to the boiling point and to evaporate water at a rate sufficient to maintain a substantially constant volume of liquid in the generator-evaporator-crystallizer.

In order to form anhydrous sodium sulphate in the generator-evaporator-crystallizer, the reaction solution must be maintained at a temperature in excess of about 30°C., and this temperature, as aforementioned, should correspond to the boiling point of the reaction solution at the operating absolute pressure. The evaporation of water at the aforementioned rate will cause the formation of crystalline anhydrous sodium sulphate in the reaction solution in the generator-evaporator-crystallizer. The $Na_2SO_4$ may be withdrawn and recovered continuously or intermittently.

The rate of total energy input into the system from all sources after steady state conditions have been reached is such that all of the water being added to the system and being formed by the reactions taking place therein, less any water of crystallization in any hydrated crystalline material which might be recovered along with anhydrous sodium sulphate, is evaporated from the reaction solution in the generator-evaporator-crystallizer and withdrawn as water vapor from the system. This rate of total energy input is related to the temperature chosen, the corresponding vacuum, the geometry of the system, the rate at which water is being added to the system after steady state conditions have been reached and the rate at which water is removed as water of crystallization.

This process presupposes the return to the generator-evaporator-crystallizer of substantially all of the liquid effluent removed from the generator-evaporator-crystallizer and from which the solid anhydrous sodium sulphate is separated. If substantially all of this liquid effluent is not returned to the generator-evaporator-crystallizer, the rate at which water is required to be evaporated therein will be reduced by the rate at which it is being removed from the system. Operating the process in this latter manner generally will be undesirable, because chlorate, chloride and sulphuric acid will be lost from the system, thereby increasing the cost of operation.

In general, some of the reaction solution will leave the vessel along with the $Na_2SO_4$. Recycle of this reaction solution to the vessel after removal of the anhydrous sodium sulphate may be desirable from an economic point of view, if relatively large amounts are involved.

By the choosing of suitable conditions of temperature, acidity, and concentration of sodium chlorate or sodium chloride in the reacting solution, the solid phase which crystallizes out will be anhydrous sodium sulphate ($Na_2SO_4$). The crystals may be removed from the generator-evaporator-crystallizer as a slurry, separated from the reaction liquor by filtration, centrifuging or other means, washed with water, if desired, and the liquor returned to the generator-evaporator-crystallizer. Since no substantial amount of the liquid effluent from the generator-evaporator-crystallizer need be removed from the system, relatively high concentrations of sodium chlorate, sodium chloride and sulphuric acid may be maintained in the reaction solution without substantial loss of these substances from the system.

The FIGURE is a schematic representation of apparatus which may be used in practising the preferred embodiment of this invention.

In this FIGURE there is shown a combination generator-evaporator-crystallizer 10. Some of the reaction solution 26, which may contain some crystals, is withdrawn from the lower chamber of the generator-evaporator-crystallizer 10 via lines 11a, 11b and 11 through a pumping device 12 and a heat exchanger 13, finally being returned to the upper chamber of vessel 10. Sulphuric acid is charged continuously via lines 14 and 11 to vessel 10.

Aqueous solutions of sodium chlorate and sodium chloride are charged continuously via line 15 to the top of a packed scrubbing tower 28. A portion of these solutions is recirculated through tower 28 by withdrawing it from the bottom of tower 28 via a line 29 and pumping device 30 and reintroducing it into line 15 above tower 28 in sufficient quantity to provide for proper wetting of the packing in tower 28. Another portion of this solution is withdrawn from near the bottom of the tower 28 via lines 15a and 11b, pumping device 12 and heat exchanger 13 and is introduced into the upper chamber of vessel 10 via line 11. Heat may be supplied to reaction solution 26 via heat exchanger 13, or by heating the feed solutions.

A slurry composed of crystals and reaction solution 26 is withdrawn from vessel 10 via lines 16 and pumping device 27 to a filtering and washing device 17. The crystals are washed with water entering washing device 17 via a line 19 which is connected to a water supply (not shown). The washed crystals are discharged via a line 18, while the reaction solution from which the crystals have been separated and the wash water are returned via lines 20, a pumping device 21, lines 11, pumping device 12 and heat exchanger 13 to vessel 10. The pumping device 21 also may be used to provide the vacuum which may be required for the operation of filtering and washing device 17.

A vacuum is applied to the upper chamber of vessel 10 via lines 22 and packed tower 28 from a venturi eductor 23 connected via a line 24 to a water supply (not shown). A line 25 is the outlet of the venturi eductor 23.

Chlorine dioxide, chlorine, water vapour and possibly some hydrogen chloride are drawn from the generator-evaporator-crystallizer 10 via lines 22 and tower 28 by eductor 23. In tower 28 the hydrogen chloride is removed from the gas stream and returned to the generator-evaporator-crystallizer with the sodium chlorate and sodium chloride feed solutions. In eductor 23 the water vapor is condensed, and a solution of chlorine dioxide and chlorine dissolved in water is withdrawn via line 25.

It will be appreciated that a barometric leg leading to a seal tank may be used in place of the lower chamber of the generator-evaporator-crystallizer 10.

The following examples are illustrative of the practice of this invention.

EXAMPLE I

A combination generator-evaporator-crystallizer was operated continuously with a chlorate/chloride feed consisting of 12.5 ml/min of a solution 3.33 molar with respect to $NaClO_3$ and 3.11 molar with respect to NaCl and a feed of 2.5 ml/min of 93% $H_2SO_4$. Water was evaporated continuously; $ClO_2$ and $Cl_2$ were removed continuously; and anhydrous sodium sulphate ($Na_2SO_4$) was crystallized continuously at rates equivalent to these feeds. Steady state conditions in the generator-evaporator-crystallizer reaction solution of 2.74 molar sodium chlorate, 0.69 molar sodium chloride, 2.00 molar $H_2SO_4$, and a temperature of 166°F and in the vapour space over the reaction solution a pressure of 167 mm of Mercury were maintained with these feeds for 6 hours. The product gas analysed as 42.1 Gram Atom per cent $ClO_2$, and the crystals filtered from the process analysed as substantially pure anhydrous $Na_2SO_4$ after washing.

EXAMPLE II

A combination generator-evaporator-crystallizer was operated continuously with a chlorate/chloride feed consisting of 12.5 ml/min of a solution 3.33 molar with respect to $NaClO_3$ and 3.19 molar with respect to NaCl and a feed of 2.36 ml/min of 93% $H_2SO_4$. Water was evaporated continuously; $ClO_2$ and $Cl_2$ were removed continuously; and anhydrous sodium sulphate ($Na_2SO_4$) was crystallized continuously at rates equivalent to these feeds. Steady state conditions in the generator-evaporator-crystallizer reaction solution of 2.71 molar sodium chlorate, 0.60 molar sodium chloride, 2.11 molar $H_2SO_4$, and a temperature of 165°F and in the vapour space over the reaction solution a pressure of 172 mm of Mercury were maintained with these feeds for 5.5 hours. The product gas analysed at about 45 Gram Atom per cent $ClO_2$ and the crystals filtered from the process analysed as substantially pure anhydrous $Na_2SO_4$ after washing.

The term gram atoms per cent chlorine dioxide means the ratio of gram atoms of chlorine present in a given volume of gas in the form of chlorine dioxide divided by the number of gram atoms of chlorine present in the form of both chlorine dioxide and molecular chlorine multiplied by 100.

It is possible to carry out the process of this invention in a single vessel without applying a vacuum thereto and with the reaction solution not necessarily being at its boiling point. This can be done by blowing air and nitrogen or other inert gas, which may be at atmospheric pressure, through the vessel, but very large volumes of gas will be required to perform the necessary evaporation of water, and consequently the chlorine and chlorine dioxide evolved will be highly diluted by the air or other inert gas.

It also is possible to carry out the process in such a way that most or at least some of the evaporation of water takes place in a separate vessel. Thus, both a generator and a combination evaporator-crystallizer may be employed in the system, the effluent from the generator being taken to the combination evaporator-crystallizer. Air or other inert gas may be blown through the generator, or a vacuum applied thereto, to sweep out the evolved chlorine and chlorine dioxide, while the evaporator-crystallizer may be operated under vacuum and at a temperature in excess of 30°C. and less than about 100°C., preferably corresponding to the boiling point of the solution therein, and the water in the system not removed as water vapor from the generator thus removed in the evaporator-crystallizer together with additional chlorine and chlorine dioxide that may be evolved therein. In essence this amounts to splitting up the functions of combination generator-evaporator-crystallizer 10.

In the latter two embodiments of this invention the effluent from the evaporator-crystallizer, after the separation of anhydrous sodium sulphate therefrom, should be returned to the generator. In some circumstances, however, for instance where sulphuric acid is required to make tall oil, it may be advantageous to remove some of the effluent from the system instead of recycling it.

While preferred embodiments of this invention have been disclosed herein, those skilled in the art will appreciate that changes and modifications may be made therein without departing from the spirit and scope of this invention as defined in the appended claims.

What is claimed is:

1. A continuous process for the generation of chlorine dioxide and chlorine and the production of anhydrous sodium sulphate ($Na_2SO_4$) which comprises: maintaining an aqueous reaction solution containing sodium chlorate, sodium chloride and sulphuric acid and having an acidity between about 1.0 and 2.4 molar in a reaction zone, in the proportions required to generate chlorine dioxide and chlorine from the reaction solution by continuously feeding sodium chlorate, sodium chloride and sulphuric acid to said reaction zone, maintaining said reaction zone under subatmospheric pressure, maintaining the reaction solution at its boiling point at the prevailing absolute pressure on said reaction solution, and at a temperature between about +30°C. and a temperature above which substantial decomposition of said chlorine dioxide would occur, to evaporate water continuously from said reaction solution, continuously generating chlorine dioxide and chlorine from said reaction solution, continuously forming a gaseous mixture of said generated chlorine dioxide and chlorine and evaporated water in said reaction zone, continuously withdrawing said gaseous mixture from said reaction zone, continuously precipitating said $Na_2SO_4$ from said reaction solution in said reaction zone, and recovering said $Na_2SO_4$ from said reaction zone.

2. A process according to claim 1 wherein the acidity of said reaction solution is maintained between about 1 molar and about 2.2 molar.

3. A process according to claim 1 wherein the molar ratio of chloride to chlorate added to said reaction solution is between about 1:1 and 6:1.

4. A process according to claim 1 wherein under steady state conditions all of the water added to said reaction zone and formed by reaction less any water of crystallization in any solid crystalline material crystallized from said reaction solution and any other water removed other than by evaporation is evaporated in said reaction zone.

5. A continuous process for the production of chlorine dioxide, chlorine, and anhydrous sodium sulphate which comprises continuously effecting the reaction of chlorate ions, chloride ions, sulphate ions, hydrogen ions and sodium ions in an aqueous solution while maintaining the acidity of said solution at from about 1.0 to 2.4 molar, whereby chlorine and chlorine dioxide are continuously generated, said process being conducted continuously at subatmospheric pressure and at a temperature between about 30°C. and a temperature above which substantial decomposition of said chlorine dioxide would occur corresponding to the boiling point of said solution at the absolute pressure thereon, and continuously evaporating, at subatmospheric pressure, sufficient water from said solution to drystallize anhydrous sodium sulphate from said solution.

6. The process of claim 5 in which said acidity is maintained at from about 1 to about 2.2 molar.

7. In a continuous process of producing chlorine dioxide by effecting the reaction of sodium chlorate with sodium chloride and sulphuric acid in a solution contained in a vessel, the steps which comprise providing in said solution a concentration of said chloride exceeding 0.60 molar and less than 3.19 molar of said chloride and of said chlorate exceeding 2.71 molar, continuously providing an acidity in said solution from about 1 to a value less than about 2.2 molar, said vessel being maintained continuously at subatmospheric pressure, said reaction resulting in the continuous formation of chlorine, chlorine dioxide and simultaneously therewith neutral sodium sulphate, said reaction being carried out at a temperature between about 30°C. and a temperature above which substantial decomposition of said chlorine dioxide would occur corresponding to the boiling point of said solution at the absolute pressure thereon, removing said chlorine and chlorine dioxide as formed in said reaction and recovering anhydrous neutral sodium sulphate by evaporating in said vessel sufficient water from said solution to crystallize said anhydrous neutral sodium sulphate in said vessel.

* * * * *